United States Patent [19]

Koike

[11] 4,447,898

[45] May 8, 1984

[54] SIMPLIFIED SOUND REPRODUCING DEVICE DRIVEN BY A SPRING MOTOR

[75] Inventor: Eishi Koike, Sagamikara, Japan

[73] Assignee: Ozen Corporation, Tokyo, Japan

[21] Appl. No.: 353,612

[22] Filed: Mar. 1, 1982

[30] Foreign Application Priority Data

Nov. 30, 1981 [JP] Japan ................................. 56-192393

[51] Int. Cl.³ .......................... G11B 27/10; G11B 3/78
[52] U.S. Cl. ........................................ 369/65; 369/31; 369/67
[58] Field of Search ........................ 369/31, 65, 67, 63

[56] References Cited

U.S. PATENT DOCUMENTS

| | | | |
|---|---|---|---|
| 3,468,546 | 9/1969 | Duncan et al. | 369/65 |
| 3,658,346 | 4/1972 | Stern et al. | 369/65 |
| 3,738,195 | 6/1973 | Stein et al. | 369/65 |
| 4,150,831 | 4/1979 | Watanabe | 369/67 |
| 4,198,057 | 4/1980 | Miuya | 369/67 |
| 4,347,595 | 8/1982 | Ngai | 369/67 |

FOREIGN PATENT DOCUMENTS 706868 12/1979 U.S.S.R. ................................. 369/65

Primary Examiner—Steven L. Stephan
Attorney, Agent, or Firm—Basile, Weintraub, Hanlon

[57] ABSTRACT

A winding knob and a winding wheel are supported around a center shaft and are rotatable together in the direction of winding and are also axially movable together without causing axial movement of the center shaft by pushing ahead the winding knob. Between a record disc being urged toward a pickup and movable along the center shaft and the winding wheel, there is provided a slippage preventing post which is placed into engagement with a retaining piece provided on the reverse face of the record by operator's winding motion while depressing the knob but is released from such engagement by the operator's subsequent depression of a starting post and the movement of the record disc away from the pickup. When the record disc returns to its initial position by the operator's releasing of depression, the slippage preventing post moves out of engagement with the locking piece. The starting post is mechanically coupled to a driving source for rotating the record disc so as to play the sounds recorded therein and also serves as an output shaft to other devices outside of the sound reproducing device. In order to stop the record disc concurrently with or immediately after the completion of sound reproduction and also to prevent undesirable turning of the record disc during a winding operation a rotatable pawl member and a stopper pawl member are disposed on the record disc and casing, respectively. By virtue of this construction, a sound reproducing device of this type can be operated exactly with a very simplified construction which also enables its driving mechanism to drive other devices disposed outside of the sound reproducing device.

6 Claims, 3 Drawing Figures

SIMPLIFIED SOUND REPRODUCING DEVICE DRIVEN BY A SPRING MOTOR

BACKGROUND OF THE INVENTION

1. Field of the Invention

This invention relates to a simplified sound reproducing device, and more particularly, to a device which enable starting, stopping and supplying output power to other means disposed outside the device.

2. Description of the Prior Art

Heretofore, many of the simplified sound reproducing devices driven by a spring motor having utilized a constant torque spring motor adopting a pull string winding system for energizing the spring.

Due to the advantages that a string as a means for pulling the constant torque spring can be wound and housed in the device and that the winding can be performed by a simple action of pulling the string, this kind of device has widely been used.

It has long been desired, particularly, for sound reproducing devices to be incorporated into toys such as talking dolls or the like which utilize sound reproducing devices of the type having a knob for winding the constant torque spring received therein.

In this kind of application, since the record disc to be played is received in the casing of the device, it is not possible to wind the spring of the motor while preventing releasing of the already wound spring by holding a driven part of the device such as wheel or wheels as can be done in a toy motor car.

Use of ratchet means have been tried, but as it was found that such ratchet means requires additional means for unlocking the ratchet means during the time of sound reproduction, the construction of such a device is liable to become complicate.

When a spring motor is incorporated in a sound reproducing device, it is apt to cause excessive slippage unless the completion of sound reproduction can be synchronized with the stopping of the rotation of the record disc.

More over, when one tries to wind the spring during and after a sound reproduction, the record disc will undesirably rotate so that ready and effective winding cannot be performed.

This drawback was similarly seen in other pull string winding systems and it has long been desired to provide some effective solution.

For machines or devices incorporating a sound reproducing devices such as talking dolls or the like, it is sometimes desired to perform an additional function such as having the dolls be able to move their eyes or mouth in harmony with their voice or sound.

If it becomes necessary to provide an exclusive power source for the aforesaid purpose, it would be impossible or very difficult to incorporate such a power source due to the size of the dolls to be used. In addition, it might result in not only an increase in undesirable weight but also difficulties in synchronizing sound reproduction with other motion together with disadvantages in the production cost.

SUMMARY OF THE INVENTION

The present invention aims to obviate the drawbacks in the kind of sound reporducing devices mentioned above.

An object of the invention is to provide a simplified sound reproducing device driven by a spring motor using a winding knob.

Another object of the invention is to provide a spring motor driven sound reproducing device which can prevent any uncoiling or slippage during the time of turning the winding knob.

A further object of the invention is to provide a sound reproducing device driven by a spring motor is capable of perfectly synchronizing completion of sound reproduction with the stopping of the record disc and to prevent the stylus of the pickup from unnecessary running or slippage.

A still further object of the invention is to simplify the mechanism for rotating and stopping the record disc of the constant torque spring motor incorporated in a simplified sound reproducing device to assure proper operation and to make the device more stout.

A yet further object of the invention is to enable a sound reproducing device to perform both sound reproduction and other related actions by utilizing the constant torque spring originally intended for sound reproduction.

According to the invention, a winding knob radially held on a center shaft is freely movable in an axial direction along the center shaft.

The winding knob and a winding gear wheel are held around the center shaft so as to be coupled integrally with each other in the directions of both winding and axial movement. A slippage preventing pole is disposed between a record disc which is urged toward a pickup of axial movement together with the center shaft and the winding gear wheel.

The slippage preventing pole, even when the pickup is halfway through playing, could be urged into engagement with a locking piece on the record disc by a first winding operation only if the operator has pushed ahead the winding gear wheel prior to the winding operation.

On the other hand, when the record disc is moved away from the pickup by the depression of a starting point, the slippage preventing post is pushed back to its original position while still being in engagement with the locking piece. However, upon returning of the record disc to its raised position when it is released from the depression of the starting post, it comes out of engagement with the locking piece and allows rotation of the record disc for the next sound reproduction.

After sound reproduction has been finished accompanied with entering of a stylus of the pickup into a recessed portion formed in a central part of the record disc, a rotatable pawl member engages a stopper pawl member to stop rotation of the record disc.

At the upper end of the center shaft, there is provided a transmission gear which is rotatable together with the record disc. The starting post has a follower gear disposed in engagement with the transmission gear is rotatable integrally with the starting post. Consequently the constant torque spring motor is able to concurrently drive both the record disc and the starting post.

By virtue this simple construction, the simplified sound reproducing device of the present invention which is driven by a spring motor is able to prevent any idle running of the record disc after it has finished its playing and any undesirable slippage contact of the sound reproducing stylus.

The device also allows smooth and ready winding of the constant torque spring without causing reverse rotation of the record disc if the operator has only previously pushed the winding knob prior to the first winding operation.

In addition, the spring motor housed in the device can be utilized to drive, via the rotatable starting post, other devices outside the sound reproducing device for performing other necessary motion or motions.

The mechanical parts or components of the device for performing these functions comprises: a winding knob, a winding gear, a slippage preventing pole which locks or unlocks rotation of the record disc by the relative axial movement of the record disc and the winding gear, a locking piece disposed on the reverse face of a record disc, a rotatable pawl member, a stopper pawl member, a starting post, a transmission gear a follower gear.

The number of parts or components mentioned above is small such that the assembled construction is very simple. Accordingly, the device functions very smoothly.

In addition, the device of this invention allows ready winding, halfway through sound reproduction, without causing undesirable rotation of the record disc, by merely pushing ahead the winding knob prior to the first winding operation.

DESCRIPTION OF THE PREFERRED EMBODIMENTS

Figure 1:
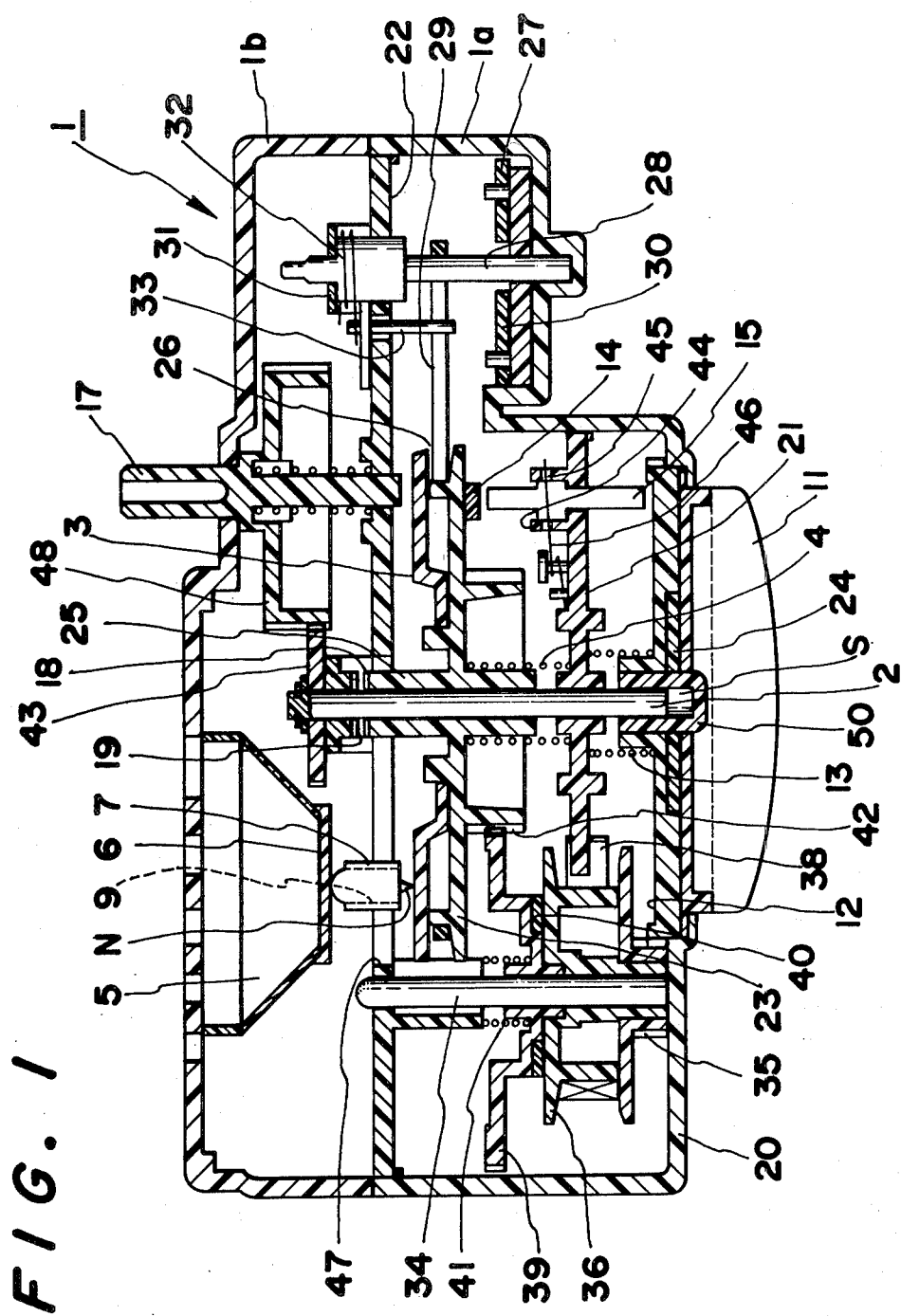
FIG. 1 is a cross-sectional elevational view of a preferred embodiment of the invention.
Figure 2:
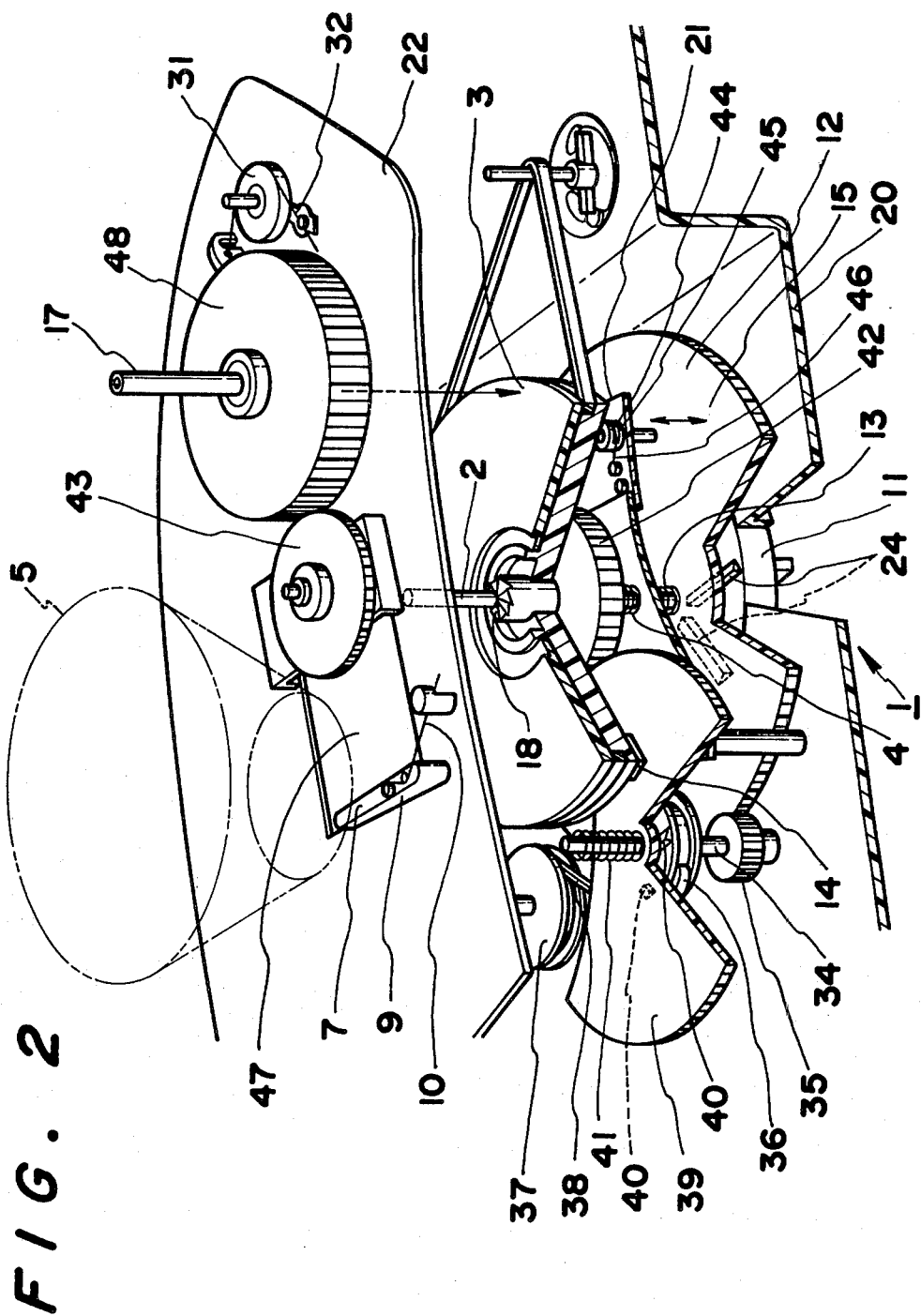
FIG. 2 is a broken-down perspective view of the device of the present invention with the housing having been removed.

As shown in FIGS. 1 and 2, a casing 1 consists of a chassis 1a and a housing 1b. The chassis 1a holds, at the reverse face of its base plate 20, a circular disc shaped winding knob 11 inserted in a circular opening of the base plate 20 which is capable of being freely advanced or retracted in an axial direction.

The chassis 11 constitutes a middle deck 21 and an upper or front deck 22.

At the center of the winding knob 11, an upright center shaft 2 is dispersed extending toward the interior of the casing 1 and is freely rotatable and movable in axial direction.

The center shaft 2 is radially received at its lower end by a bearing 50 disposed at the central part of the winding knob 11 and extends upward passing through the middle deck 21, with the top end being received by the front deck 22.

Around the center shaft 2, a winding gear 12 is disposed below the middle deck 21 and a turn table 23 integrally carrying a record disc 3 for both rotational and axial movement at a position between the middle deck 21 and the upper or front deck 22.

Disposed between the winding wheel 12 and the winding knob 11 is a first ratchet 24 which locks the two members only in a direction for effecting winding.

A third spring 13 is placed under compression between the middle deck 21 and the winding gear wheel 12, such that both the winding gear wheel 12 and the winding knob 11 are urged downward, namely, toward the direction of retraction so as to be engageable with the first ratchet 24.

The central part of the turn table 23 constitutes a cylindrical hollow shaft 25, the upper end of which forms a rotatable pawl member 18, which locks the turn table 23 in the direction of rotation for effecting sound reproduction.

The turn table 23 is fixed to the center shaft 2 and also is urged, by a first spring 4 placed under compression between the middle deck 21 and the turn table 23, toward the direction of advancing, namely, upward.

The center shaft 2 and the bearing 50 are assembled such that a space S can be formed between the lower end of the shaft 2 and the bottom face of the bearing 50 so as to enable advance movement of the winding knob 11 and winding wheel 12 only.

The record disc 3 has a recessed portion at the central portion, the inner periphery of which is received by an annular boss of the turn table 23 being integral with the turn table 23 for both rotational and axial movement.

The outer periphery of the stacked assembly of the turn table 23 and the record disc 3 includes an annular pulley groove 26.

The chassis 1a has a governor 27 at a position outside and below the pulley groove 26.

The governor 27 is rotated together with the record 3 and the turntable 23 when driven by a belt 29 extended around and between the pulley groove 26 and the shaft 28 of the governor 27.

During rotation of the governor 27, a governor piece frictionally contacts the surface of the chassis 1a and adjusts the rotational speed of the record disc 23 and turn table 3 as a whole.

The shaft 28 of the governor 27 is journally received at its upper end by the front deck 22 and the tip end of the received shaft 28 is provided with an auxiliary governor 31 comprising a friction pole 33 resiliently urged by a sixth spring 32 so as to be frictionally pushed against the belt 29 to adjust its speed.

The extent of such frictional contact can be changed by adjusting the number of turns of the sixth spring 32.

On the chassis 1a and alongside the winding wheel 12, a drive shaft 34 is disposed upright, around which a winding follower gear 35 is carried for free rotation and meshes with the toothed winding wheel or gear 12.

The winding follower gear 35 has a face width which permits to some extent axial movement of the winding gear wheel 12. A winding reel 36 of the constant torque spring motor is integrally formed above and co-axially with the follower wheel 35.

As particularly shown in FIG. 2, on the chassis 1a and alongside the winding reel 36, a pay-off reel 37 is disposed from which a constant torque spring 38 is paid out and wound around the winding reel 36.

A drive wheel 39 is co-axially disposed on the front, namely, on the upper face of the winding reel 36. Between the two confronting faces of the drive wheel 39 and the winding reel 36, a ratchet 40 is interposed so that the winding reel 36 becomes freely rotatable when it is rotated in the direction of winding but the winding reel 36 and the drive wheel 39 are coupled together in the direction of driving.

A seventh spring 41 is compressed between the front deck 22 and the drive gear 39 so that the drive gear 39 normally contacts the winding wheel 36 under resilient force.

A follower gear 42 is formed at the central part of the reverse face of the turn table 23 and, being integral therewith, meshes with the drive gear 39. It is to be noted that the follower gear 42 has a face width sufficient enough to permit its meshing with the drive gear 39 when the follower gear 42 is axially moved.

A locking piece 14 is fixedly attached on an appropriate portion on the reverse face of the turn table 23 and projects toward the middle deck 21.

The middle deck 21 also has a sleeve 44 projecting alongside and parallel to the center shaft 2, in which a slippage preventing pole 15 is received for axial sliding motion and has a length longer than the sleeve 44.

The front and rear tips of the slippage preventing pole 15 are spaced apart, respectively, from the reverse face of the turn table 23 and the front face of the winding gear wheel 12 with a distance less than the extent of axial travel of the winding gear wheel 12.

A transverse slit 45 reaching to the inside face of the sleeve 44 is cut on the side face of the sleeve 44, along which a fifth spring 46 is placed so as to resiliently bias the outer side face of the slippage preventing pole 15. By virtue of this construction, the slippage preventing pole 15 is maintained at its axial position in the sleeve 44 due to the frictional contact imparted by the fifth spring 46.

The fifth spring 46 is turned around a post or posts disposed on the middle deck 21 and extends further along the transverse slit 45 to hold the slippage preventing pole 15 with a desired resilient force.

In front of the front deck 22, namely, above the front deck, a tone arm 9 carrying a pickup 7 is swingable attached and resiliently urged to move toward both the starting point of sound reproduction and away from the recorded face of record disc 3.

Biasing of the tone arm 9 is performed by a second spring 10.

Numeral 47 in the drawing denotes an apertured passage for allowing travel of the pickup.

As can be particularly seen in FIG. 1, a speaker cone 5, having at its bottom a vibration plate 6, is fixedly attached to the inside face of the housing 1b. The vibration plate 6 contacts its under face with the upper face of the pickup 7, which is opposite to the sound reproduction stylus N which extends through the apertured passage 47 and contacts the recorded face of the record disc 3.

A starting post 17 is mounted on the front deck 22 alongside and parallel to the center shaft 2.

The starting post 17 is held by the housing 1b and the front plate 22 and is capable of axially advancing or retracting; but is normally urged by a fourth spring 16 toward the direction away from the record disc 3.

One end of the starting post 17 protrudes beyond the upper (outer) face of the housing 1b, while the other end, upon the operators depression against its resilient force, can advance to the recorded face of the record disc 3 so as to urge the record disc to its retracted position.

The starting post 17 has an integrally formed co-axial driven follower gear 48 having some extent of face width in the axial direction.

Around the upper portion of the center shaft 2 a transmission gear wheel 43 projects above the bearing portion of the front deck 22 and is integrally attached to the center shaft 2 for both rotational and axial movement. The transmission gear wheel 43 also meshes with the driven follower gear 48, so that the starting post 17 is also able to play a role as an output shaft for the other means provided outside the device.

In such instances, the starting post 17 can be extended further above the casing 1 and alternatively can be provided with gears or pulleys (not shown) as a means for transmitting a driving force to other devices.

The device of this embodiment of the invention operates in the following manner.

FIG. 1 shows the device of this invention in a playing position. The sound reproducing stylus N travels toward the central part and, upon completion of sound reproduction, will arrive to the end point of sound reproduction in the recessed portion formed at the central part of the record disc 3 accompanied with advancing movement of the record disc 3 itself together with the turn table 23 due to the resilient force given by the first spring 4.

At the same time, the rotatable pawl member 18 is placed in engagement with the stopper pawl member 19 and causes the turn table 23 to stop its rotation.

Next, the winding knob 11 is turned with a first turning of the operator's wrist to effect winding of the spring.

Since the rotatable pawl member 18 has already been engaged with the stopper pawl member 19, as mentioned above, the turn table 23 is prevented from making any undesired rotation in the direction of sound reproduction even if the constant torque spring 38 has been energized by the operator's first turning and the operator takes his hand off the winding knob 11 for his next wrist turning.

The winding gear 12 has been coupled via the ratchet 24 with the winding knob 11 in the direction of rotation for winding, so that it is rotated upon rotation of the follower gear wheel 35 resulting in rotation of the winding reel 36 for winding the constant torque spring 38.

By virtue of the ratchet 40, rotation of the winding follower gear 35 does not allow the drive gear 39 to rotate.

After having finished the winding operation, the operator's depressing of any one of the starting posts 17 will urge the record disc 3 toward retraction which allows the rotatable pawl member to shift away from engagement with the stopper pawl member 19 and enables the record disc 3 together with the turntable 23 to rotate and the pickup 7 to return to the starting point of sound reproduction.

Then the drive gear 39 is allowed to rotate via the ratchet 40 by the constant torque spring motor along with rotation of the follower gear 42 and the turntable 23.

It sometimes happen that the constant torque spring is fully released halfway through sound reproduction of it is required to wind the spring during playing.

At this position, however, the rotatable pawl member 18 is already out of engagement with the stopper pawl member 19 and is further held by the pickup 7 via the record disc 3 and the turntable 23.

Consequently, the mere turning of the winding knob 11 results in undesired rotation of the turntable 23 in the direction of releasing the spring but does not perform any effect winding.

Now it is possible to push ahead the winding knob 11 to make it advance and to push the slippage preventing pole 15 forward until it impinges upon the locking piece 14 disposed on the reverse face of the turntable 23.

By virtue of this motion the turntable 23 is locked for subsequent winding by preventing any free turning of the turntable 23.

It is to be noted that the winding knob 11 can be pushed to stop playing halfway during sound reproduction.

Normally the starting post 17 is depressed, after the constant torque spring has been completely wound, to allow the pickup 7 to return to the starting point of sound reproduction.

Subsequent releasing of the depressed starting post 17 enables the record disc 3 to advance by the resilient force of the first spring 4 until it engages the stylus N.

Since the slippage preventing pole 15 has already been retracted having been pushed by the turntable 23 and is positioned out of engagement with the locking piece 14, the turntable 23 and the record disc 3 are free to rotate.

The output transmission gear 43 provided at the top of the center shaft 2 transmits rotation of the turntable 23 via the center shaft 2 to the output follower gear 48 which accompanies rotation of the integrally formed starting post 17.

Figure 3:
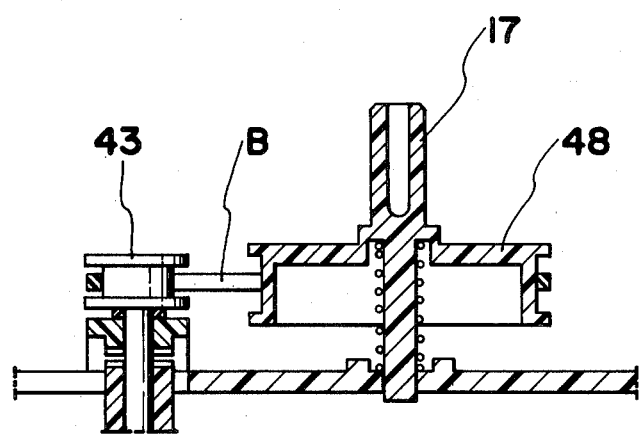
FIG. 3 is a cross-sectional view showing a part of another embodiment of the present invention.

FIG. 3 shows another exemplary embodiment, in which the output transmission member 43 and the follower member 48 are pulleys coupled by a belt B.

I claim:

1. A sound reproducing device comprising:
   a casing;
   a center pin mounted upright within the casing;
   a record disc having a recorded face thereon with starting and end points of reproduction;
   a turntable supported on and axially movable between advanced and retracted positions on the center shaft, the turntable carrying the record disc;
   a speaker cone disposed within the casing;
   a vibrating plate mounted on the bottom of the speaker cone;
   a pickup mounted within the casing for lateral and vertical swinging movement between the vibrating plate and the record disc, the pickup having an upper face capable of slidingly contacting the vibrating plate;
   a recording stylus mounted on the pickup and capable of engaging the recorded face of the record disc;
   first means for biasing the turntable and the record disc toward the vibrating plate to impart stylus pressure to the reproducing stylus;
   second means for biasing the pickup toward both the starting point of sound reproduction on the record disc and away from the recorded face of the record disc;
   a winding knob supported on the center shaft and axially movable with respect to the center shaft, the winding knob being movable between winding and retracted directions;
   a winding gear wheel capable of being coupled with the winding knob in the direction of winding of the winding knob and axially movable together with the winding knob along the center shaft;
   third means for biasing the winding knob and the winding gear wheel toward the retracted direction;
   a locking piece integrally formed on the turntable opposite from the side carrying the record disc;
   a slippage preventing pole disposed between the winding gear wheel and the record disc and advanced by the winding gear wheel into engagement with the locking piece, the slippage preventing pole being retracted by pushing movement of the record disc when the record disc is in the retracted position and released from engagement with the locking piece when the record disc advances toward the reproducing stylus;
   a starting post disposed parallel to the center shaft within the casing;
   fourth means for normally biasing the starting post away from the record disc, the starting post being capable of moving the record disc to the retracted position when depressed;
   transmission means disposed on top of the center shaft and rotatable with the record disc; and
   transmission follower means fixedly attached to the starting post and coupled to the transmission means to enable the starting post to function as a rotatable output shaft.

2. The sound reproducing device as claimed in claim 1, in which each of said power transmission means and said transmission follower means is a gear wheel.

3. The sound reproducing device as claimed in claim 1, in which each of said power transmission means and transmission follower means is a pulley driven by a belt.

4. The sound reproducing device as claimed in claim 1 further including:
   a sleeve disposed in the casing;
   the slippage preventing pole being slidably supported in the sleeve; and
   a fifth spring for biasing the slippage preventing pole so that the axial position of the slippage preventing pole can be maintained with respect to said sleeve.

5. The sound reproducing device as claimed in claim 1, in which said record disc can be rotated and axially moved together with said center shaft via the turntable.

6. The sound reproducing devcie as claimed in claim 1, which further comprises, a rotatable pawl member attached to said center shaft and being rotatable and axially movable for advancing and retracting together with said center shaft and, and a stopper pawl member fixedly disposed in said casing, the stopper pawl member being capable of engaging said pawl member in the advanced position so as to stop rotation of said record disc.

* * * * *